United States Patent [19]

Hulin et al.

[11] 4,382,732
[45] May 10, 1983

[54] MACHINING STATION FOR A PRODUCTION LINE FOR OPTICAL FIBER CABLE ELEMENTS

[75] Inventors: Jean P. Hulin; Gilles DuBois, both of Conflans Ste. Honorine, France

[73] Assignee: Lignes Telegraphiques et Telephoniques, St. Honorine, France

[21] Appl. No.: 148,992

[22] Filed: May 12, 1980

[30] Foreign Application Priority Data

May 15, 1979 [FR] France .................. 79 12282

[51] Int. Cl.³ .................. B23D 1/20; B23D 13/02
[52] U.S. Cl. .................. 409/304; 82/20; 82/64; 82/DIG. 1; 83/171; 408/148; 409/348
[58] Field of Search .......... 409/310, 304, 305, 347, 409/348; 407/1; 82/DIG. 1, 20, 64, 65; 83/171; 408/73, 74, 148, 149

[56] References Cited

U.S. PATENT DOCUMENTS

| | | | |
|---|---|---|---|
| 2,569,566 | 10/1951 | Hottman | 82/64 X |
| 2,865,238 | 12/1958 | Retterath | 409/304 |
| 3,290,995 | 12/1966 | Pull | 409/310 |
| 4,221,513 | 9/1980 | DuBois et al. | 409/131 |

FOREIGN PATENT DOCUMENTS

| | | |
|---|---|---|
| 2651725 | 4/1978 | Fed. Rep. of Germany . |
| 1350724 | 12/1963 | France . |
| 1476393 | 2/1967 | France . |
| 2052016 | 4/1971 | France . |
| 1168020 | 10/1969 | United Kingdom . |

Primary Examiner—Z. R. Bilinsky
Attorney, Agent, or Firm—Oblon, Fisher, Spivak, McClelland & Maier

[57] ABSTRACT

A machining tool comprises an annular structure having the same number of teeth as there are grooves to be machined, arranged radially in the structure, each tooth carrying a pin engaged in a curved slot. It also comprises a locking device constituted by a ring occupying a recess in the structure and a system of pawls carrying fingers which penetrate into the curved slots of the structure. It also incorporates a collar for controlling the locking device.

3 Claims, 9 Drawing Figures

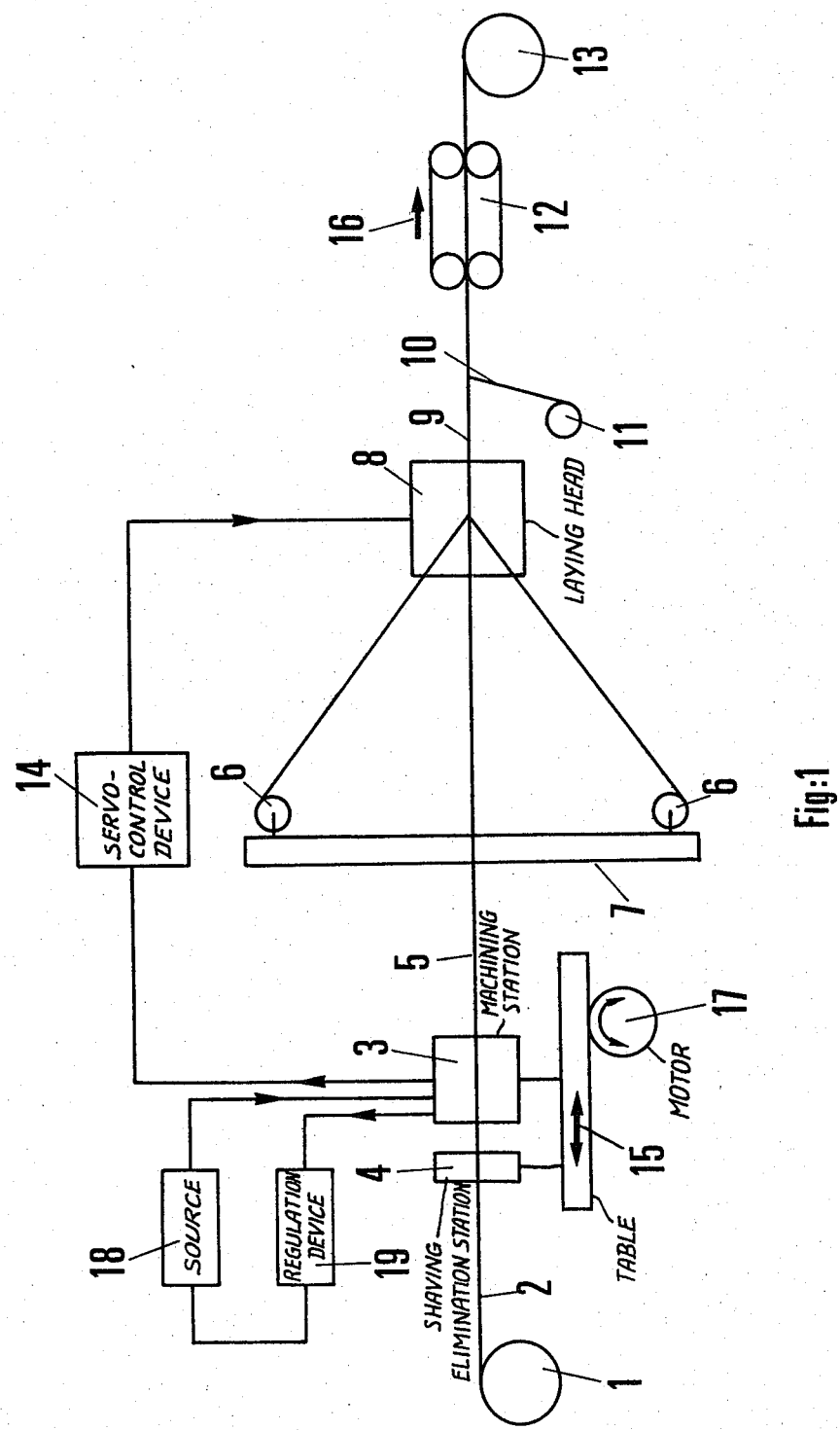

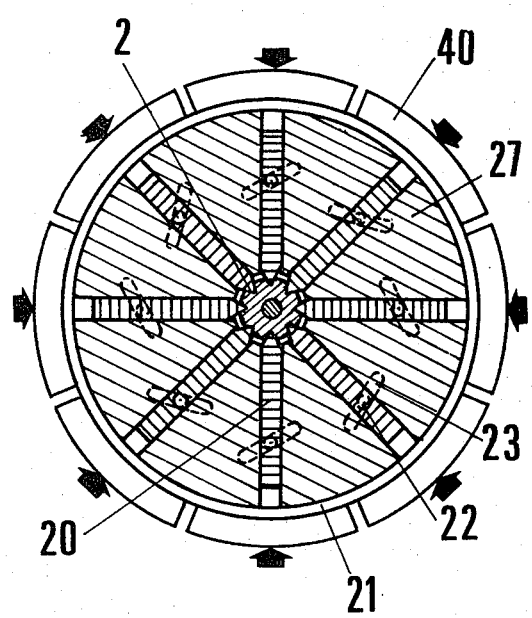
Fig: 2
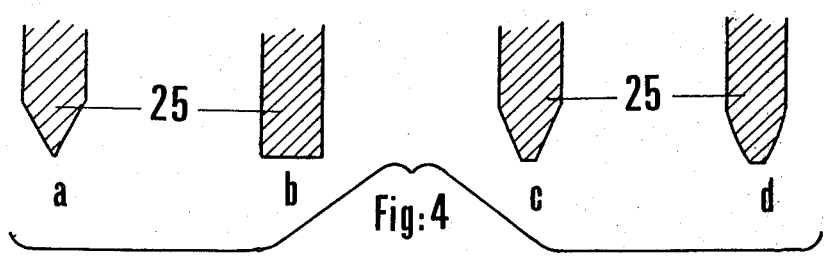
Fig: 4

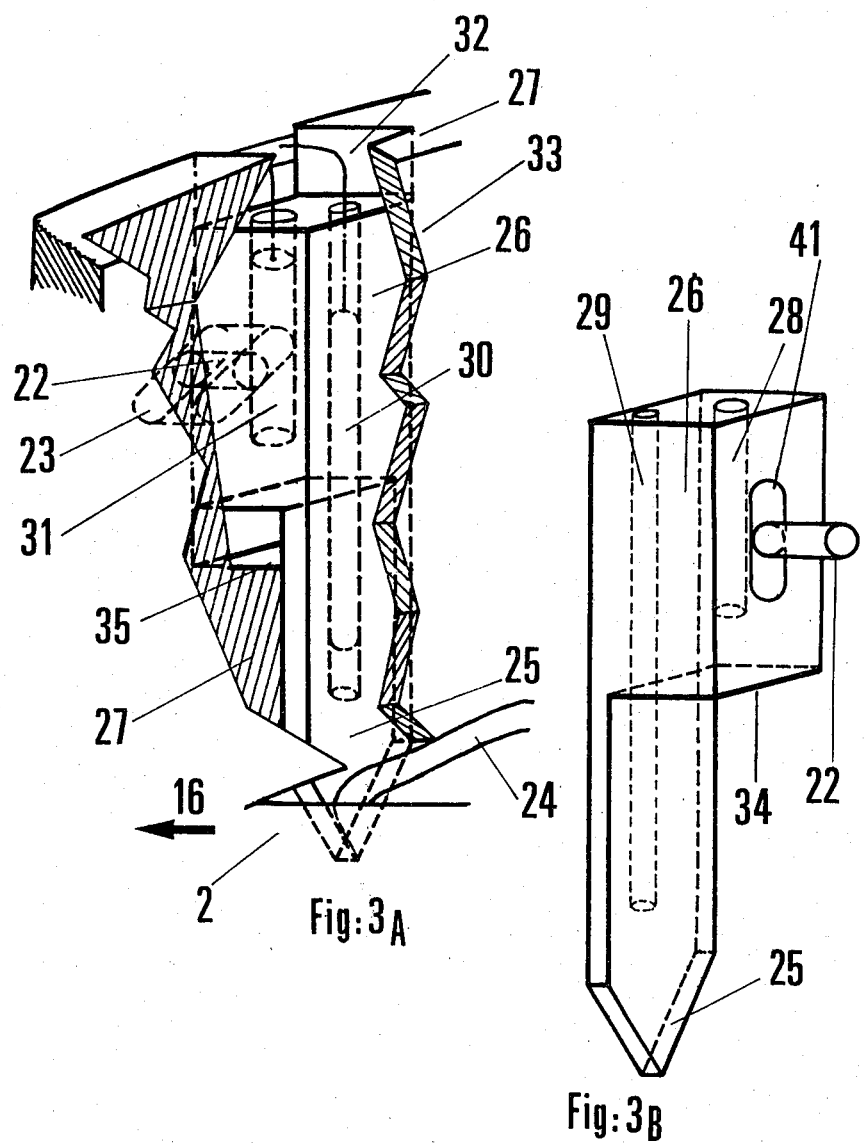

MACHINING STATION FOR A PRODUCTION LINE FOR OPTICAL FIBER CABLE ELEMENTS

BACKGROUND OF THE INVENTION

The present invention relates to machines for producing elementary cables constituted by a rigid dielectric support having grooves or slots in which optical fibers protected by a subsequent taping are placed. An optical fiber cable element of this type is described in U.S. patent application, Ser. No. 877,872, filed by the Assignee on Feb. 15, 1978 and entitled "Cable incorporating optical fibers".

The U.S. Pat. No. 4,221,513 describes a method for continuously machining grooves which are helical or have an alternating pitch in a dielectric member for forming the optical fiber support of an optical fiber cable element. The U.S. Pat. No. 4,237,687 entitled "Optical fiber laying head for cable productions" describes a device which permits the continuously simultaneous laying of all the optical fibers in the grooves of a previously machined cylindrical support. The tandem arrangement of these two stations in a continuous production line for cable elements leads to difficulties during operation due particularly to the inevitable interruptions and occur more specifically on starting up the production line. Thus, as it is explained in said U.S. Pat. No. 4,221,513 entitled "Method of continuously machining supports for electromagnetic wave guides", the grooves are machined hot, at a temperature which depends on the nature of the material forming the support. This temperature is approximately 200° C. in the case of medium density polyethylene. When the machining station is stopped accidentally or deliberately, the support is immobilized and there is a local overheating of the area in the vicinity of the tool, due to the thermal inertia of the latter. Thus, it is not possible to merely recommence production by starting up the process again, because a certain length of the support will have been damaged by the overheating. It is therefore impossible to incorporate the aforementioned machining station in a production line, which has necessarily to be stopped and restarted without damaging the elements constituting the cable.

BRIEF SUMMARY OF THE INVENTION

The present invention relates to a machine for continuously machining grooves in a cylindrical plastic member which can be introduced into a production line for optical fiber cable elements, i.e. it makes it possible to carry out in line the operations of machining the grooves in the support, placing the fibers in the grooves and fitting the protection and sheath.

According to the essential feature of the invention, the groove machining tool incorporates a plurality of radial teeth, whose number is equal to that of the grooves to be formed, associated with an annular mounting having two concentric collars whose relative rotation ensures a radial displacement of the teeth and permitting an independent position of each of these teeth. The tool incorporates means for permitting a displacement in translation of the machining station parallel to the movement of the fiber support. In the normal operating position, it is as close as possible to the fiber laying head. Preferably, a device for aspiring the shavings is placed upstream of the machining station and is associated with the latter. The fiber machining head is preferably of the type described in said U.S. Pat. No. 4,237,687 entitled "Optical fiber laying head for cable productions" and is servo-controlled by the groove machining tool.

According to a feature of the invention, each of the teeth has its own heating element placed in the vicinity of the cutting zone and a thermosensitive sensor with supplies a circuit for controlling the temperature of said tooth.

According to another feature of the invention, the profile of the cutting tip of the teeth is a curved triangle.

According to another feature of the invention, the annular mounting incorporates two coaxial rings, the first being contained in a groove of the second and carries devices for locking the teeth placed in individual recesses in the first ring.

The tool according to the present invention has the advantage of an excellent flexibility of operation. If the tool stops, the teeth are radially retracted. And, the machining of the groove is stopped without damage to the electrical support. The withdrawal of the teeth eliminates any overheating of the teeth. The temperature servo-control of each of the teeth makes it possible to accurately adjust the cutting conditions and improves the surface state of the grooves. The longitudinal displacement of the machining head makes it possible to resume the machining of the elements, whilst maintaining the geometrical characteristics and the surface state of the grooves. Before restarting the production line, as the machine head has been displaced downstream of the operating position, the teeth progressively and spontaneously position themselves in the grooves as soon as the machine system resumes its operating position. The restarting of the line ensures the continuity of the groove.

The radial displacement of the teeth makes it possible to control the cutting depth and facilitate the adjusting of the cut for a given tooth profile.

The use of retractable teeth facilitates their construction by conventional machining means and makes it possible to obtain a better geometrical definition of the cutting part and smaller tolerances.

BRIEF DESCRIPTION OF THE DRAWINGS

The invention is described in greater detail hereinafter relative to non-limitative embodiments and the attached drawings, wherein show:

FIG. 1, a general view of a production line according to the invention;

FIG. 2, a front view of the machining tool;

FIG. 3A is a perspective view of a fitted cutting tooth and FIG. 3B is a tooth separated from the tool;

FIG. 4, in section variants of the tooth tips;

DETAILED DESCRIPTION OF THE PREFERRED EMBODIMENTS

Figure 5A:
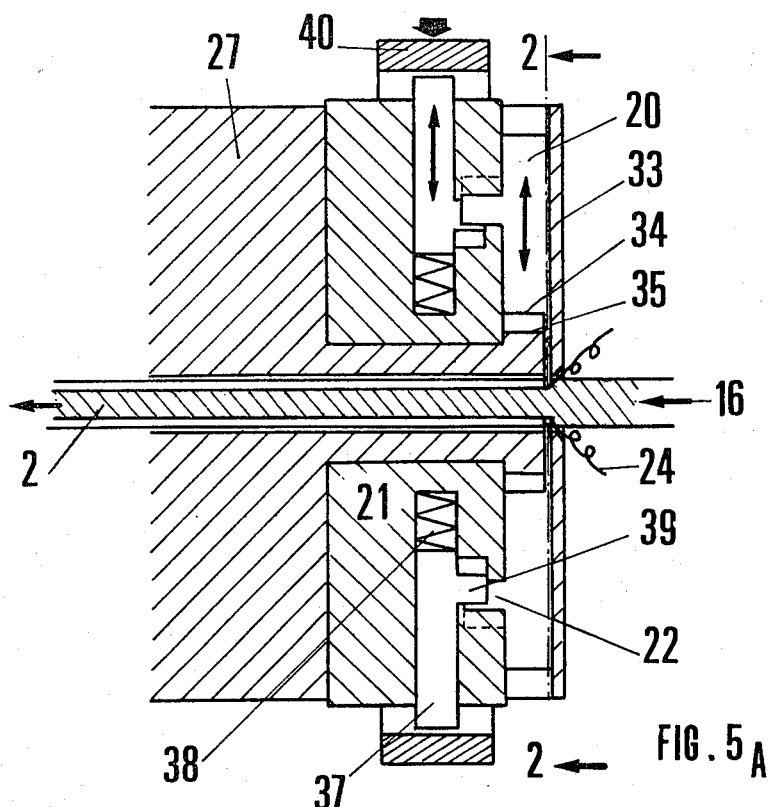
FIG. 5A is a sectional view of the machine head in the operative and in FIG. 5B in the operative position.

FIG. 1 shows a supply means 1 for a smooth dielectric support 2 transformed into a grooved support at the machining station 3 associated with the shaving elimination station 4. The grooved support 5 receives the optical fibers supplied by storage means 6 located on plate 7 fixed to the laying head 8.

The grooved support provided with optical fibers 9 is surrounded by a protective tape 10 supplied by the taping machine 11. The drawing device is 12 and the reception device is 13 serving as a storage means for the cable element. According to the particular requirements in the case of helical grooves, it is possible to have rotary supply means 1, drawing device 12, and reception device 13, whereas the other line elements are fixed. According to a preferred variant, the machining station 3-4 and the fiber laying station 8-7 rotate, whilst the other line elements are fixed. In the drawing, 14 is a servo-control device which is used in this second variant for synchronizing the laying station 8 with the machining station 3. The machining of the grooves with an alternating pitch is carried out in an identical manner.

According to a feature of the invention the machining station 3-4 is mounted on a table 15, which is movable in translation in the cable travel direction 16 under the action of motor 17. As the machining takes place hot, 18 is the source which raises the machining station 3 to the optimum temperature taking account of the travel speed of the material of support 2. According to a feature of the invention, each of the tools incorporates a temperature sensor generating a signal used at 19 for regulating the supply 18 of the heating resistors. Thus, the line can be entirely automated. Means 1, 11, 12 and 13 are standard commercially available components. The fiber laying system 6, 7, 8, and the shaving elimination device 4 are of the type described in U.S. patent application, Ser. No. 16,385, filed by the Assignee on Mar. 1, 1979.

The machining station 3 is shown in detail in the following drawings. The machining head 3 shown in front view in FIG. 2 comprises a plurality of teeth 20 arranged in a regular manner in accordance with the radii of a circumference, the centre of which is occupied by the support 2 in the recesses of an annular mounting 27, whose downstream face has been removed in FIG. 2 (c.f. axis 2—2 in FIG. 5a). Each tooth 20 carries an axial pin 22 which penetrates into a slot 23, which is curved inwards relative to the axis of the tooth in the mounting 27 shown in dotted line form in the drawing. A control collar 40 has the effect of locking the pin 22 at one or other of the ends of slot 23 in accordance with its own position as will be explained hereinafter. A locking device shown in FIGS. 5 and 6 cooperates with each tooth and is carried by a ring 21 which is rotatable relative to ring 27, as will be explained hereinafter with reference to FIG. 5.

FIG. 3a is a perspective view of the tooth mounted in the machining head and FIG. 3b is a view of the detached tooth, after reversing by 180° about a vertical axis. The tooth comprises a solid body 26 terminated by the tapered cutting tip 25, whose end penetrates into the support 2 travelling in the direction of arrow 16. The solid body supports the pin 22, which penetrates into the inclined slot 23. The body of the tooth has bores 28, 29, the second bore extending into tip 25. These bores respectively serve to house a heating resistor 30 and a temperature sensor 31 making it possible to raise the tooth to the desired temperature and maintain it at this temperature, as is known in the art.

As can be gathered from FIG. 3a, tooth 20 is engaged in a recess 32 constituted by a slit in the annular mounting 27 whose base 33 has been cut away to make it easier to see the tooth. For the same reason, the front view of FIG. 2 is in a plane perpendicular to the axis of the member to be machined located downstream of base 33 (in the direction of travel), as is indicated by axis 2—2 in FIG. 5. Recess 32 reproduces the shape of the tooth, the inner face 34 of solid member 36 facing a shoulder 35 of structure 27, which acts as an abutment, as would be apparent from FIG. 5b. Recess 32 is radially extended by a narrowed portion serving as a guide for tip 25, which is maintained between the inner face 33 and the face extending shoulder 35. The only displacement which can be carried out by the tip 25, except for play, is a radial displacement (vertical in FIG. 3a). A ring 21 which is coaxial to structure 27 surrounds the visible part of 27. As can be gathered from FIG. 5, ring 21 occupies a groove machined in structure 27. The ring 21 is rotatable with respect to structure 27 and carries devices for locking the teeth 20 (shown at 37-39 in FIG. 5) but not shown in FIG. 3. The ring 21 also carries slots 23. Locking is ensured by a pawl 37 which immobilizes pin 22 in slot 23. The control collar 40 acts on the locking devices and on the angular position of ring 21.

As can be gathered from FIG. 3b, pin 22 is attached to said member 26 at the bottom of a groove 41. The adjusting of the position of 22 in the groove makes it possible to adjust the penetration depth of tip 25 of each tooth in support 2 to be machined. The fixing of the pins is adjusted before starting up the production line by means of a model machined to the desired profile replacing support 2.

FIG. 4 diagrammatically shows sectional views of variants of tips 25 of teeth 20. FIG. 4a shows the variant of FIG. 3 in which tip 25 is triangular. FIG. 4b shows a tooth with a rectangular profile making it possible to hollow out grooves which are larger than in the previous variant. It is used for large diameter fibers. FIG. 4c shows a tooth, whose end is truncated. FIG. 4d corresponding to the preferred variant when the support is made from medium density polyethylene, illustrates a tip in the form of a truncated curved triangle. This profile eliminates the risk of the fiber being locked at the bottom of the groove and facilitates the machine whilst reducing the cutting force.

It is easy to obtain such profiles by conventional machining.

Figure 5B:
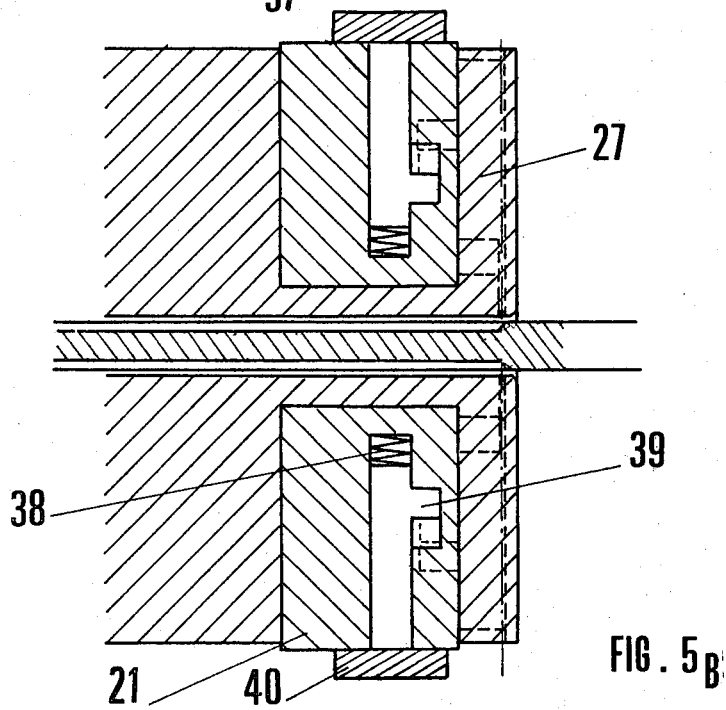

FIGS. 5a and 5b are sectional views in accordance with a diameter of the machining head in the operative and inoperative positions, respectively.

Figure 6A:
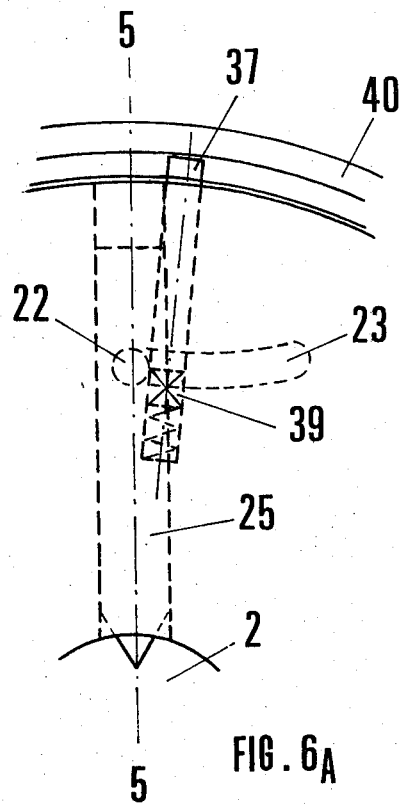
FIG. 6A shows the teeth in the operative position and 6B in the inoperative position.
Figure 6B:
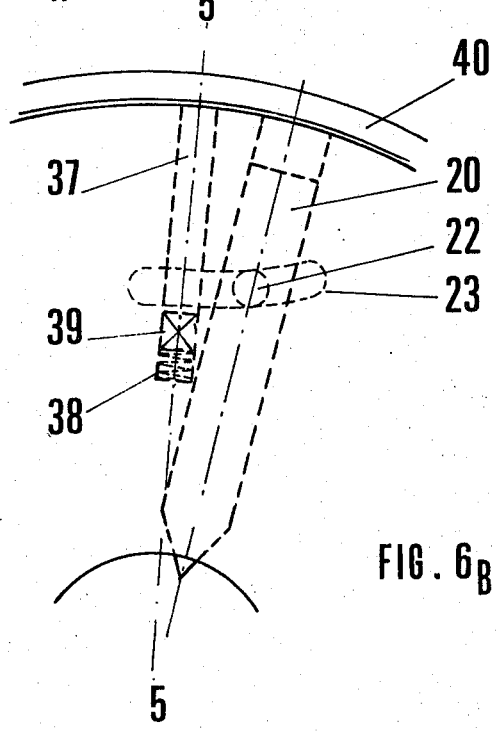

FIGS. 6a and 6b are diagrams of certain components of the head, in elevation, under the same conditions respectively. The cutting plane lines of FIG. 5 are indicated by axis 5—5 in FIG. 6.

It is possible to see the annular structure 27, the support 2 to be machined, the tooth 20 guided by the base 33 of the recess of 27 in which it is inserted, and the shaving 24 cut by the tip of tooth 20 in support 2. In the operative position the locking ring 21 locks pin 22 at the lower end of slot 23 (FIG. 6a). This ring 21 which occupies the downstream part of structure 27 essentially comprises an annular ring 21 in which there is a radial groove in which can be radially displaced a pawl 37, as is indicated by the arrow. This occurs under the action of a radial force exerted by a spring 38 occupying the bottom of the groove or by the pressure exerted by the control collar 40. The pawl 37 carries a finger 39 which, on penetrating into slot 23, bears against the pin 22 and locks the pin at the lower end of the slot. Under the action of collar 40 which brings about a stop (FIG. 5b) pawl 37 is driven into its recess, flattening spring 38 and the collar 40 immobilizes ring 21. Structure 27 continues its rotation and pin 22 follows slot 23. The inclination of the latter brings about the radial rise of tooth 20 and removes its tip 25 from the groove of support 2. On separating the teeth, the machining system 3-4 is displaced upstream by motor 17.

On starting up, structure 27 is rotated in the direction opposite of that at the time of stopping. Pin 22, following slot 23, brings about the radial displacement of the tooth towards the axis up to its operative position. The movement of control collar 40 frees the pawl 37, which under the action of spring 38 re-assumes its operative position. Finger 39 locks pins 22 in slot 23. The head is in the operating state. Motor 17 returns the head to its working position and the rotation of structure 27 is reversed. This brings about a self-centering and the displacement of the support is resumed.

What is claimed as new and desired to be secured by Letters Patent of the United States is:

1. A station for continuously machining grooves in a member such as an optical fiber cable support, comprising:
   a plurality of teeth, whose number is equal to that of the grooves to be machined, each of said teeth including a solid body provided with a pin, and a thin cutting tip;
   an annular structure having a groove and a plurality of radial recesses, the number of said recesses being the same as that of said teeth, each of said teeth issuing at the two ends of each said recess, each said recess including a first radially inner portion serving as a guide for the tooth tip therein, and a second radially outer portion housing said solid body of said tooth, said inner and outer portions being separated by a shoulder;
   a ring positioned in said groove in said annular structure, said ring including radial recesses and a plurality of curved slots, each of said slots engaging said pin of one of said teeth;
   a plurality of pawls positioned in said recesses of said ring, said pawls including fingers penetrating into said slot of said ring, said pawls cooperating with said pins by means of said fingers which penetrate into said slots of said ring;
   a collar engageable with said pawls for controlling said pawls and said ring;
   means for translating said annular structure parallel to the direction of travel of said member;
   means for heating each said tooth; and
   means for controlling the temperature of each said tooth.

2. A machining station as claimed in claim 1, wherein said cutting tip of the teeth is a truncated curved triangle.

3. A machining station as claimed in claim 1, wherein each tooth has two bores respectively occupied by a heating resistor and a temperature sensor.

* * * * *